Patented June 25, 1935

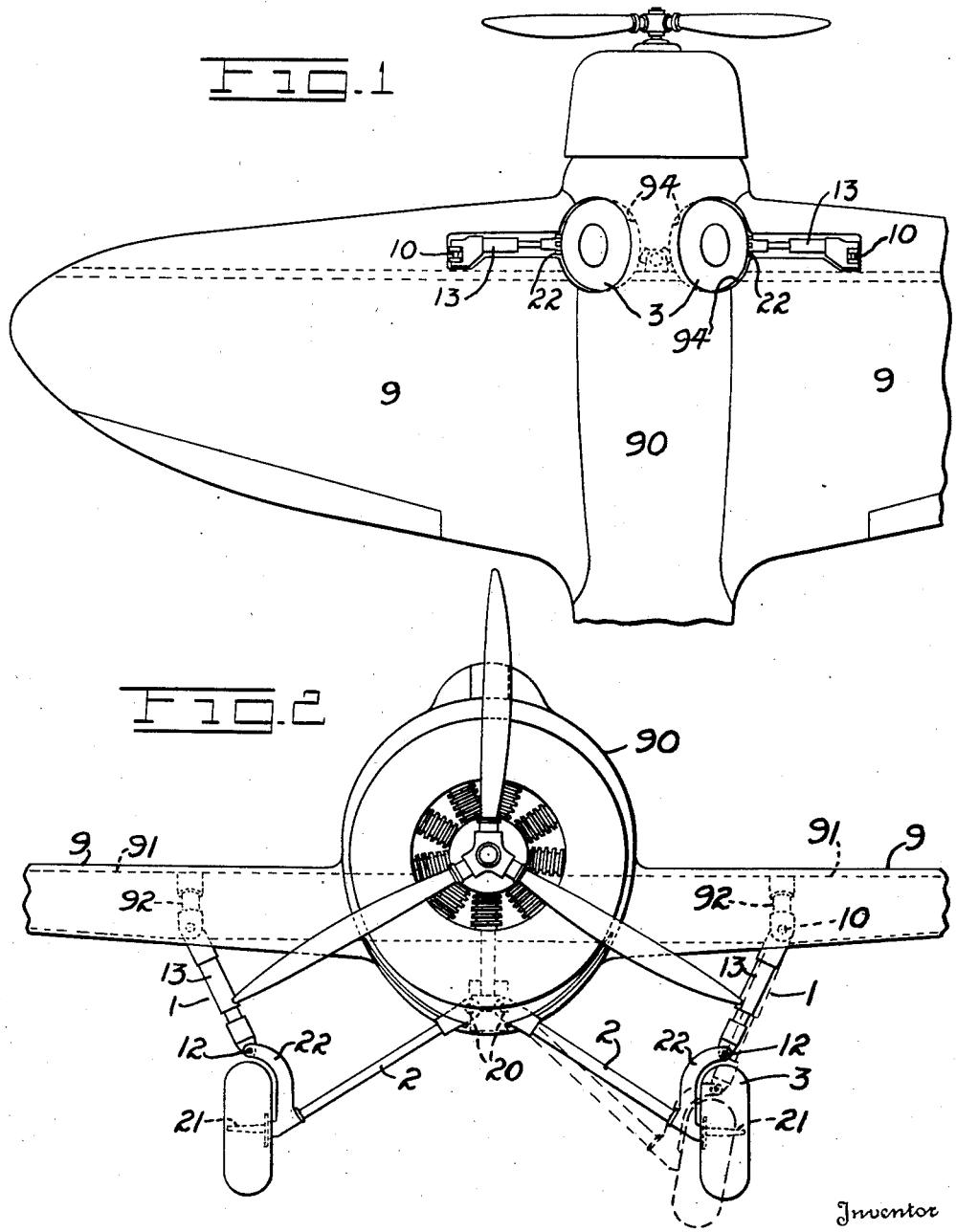

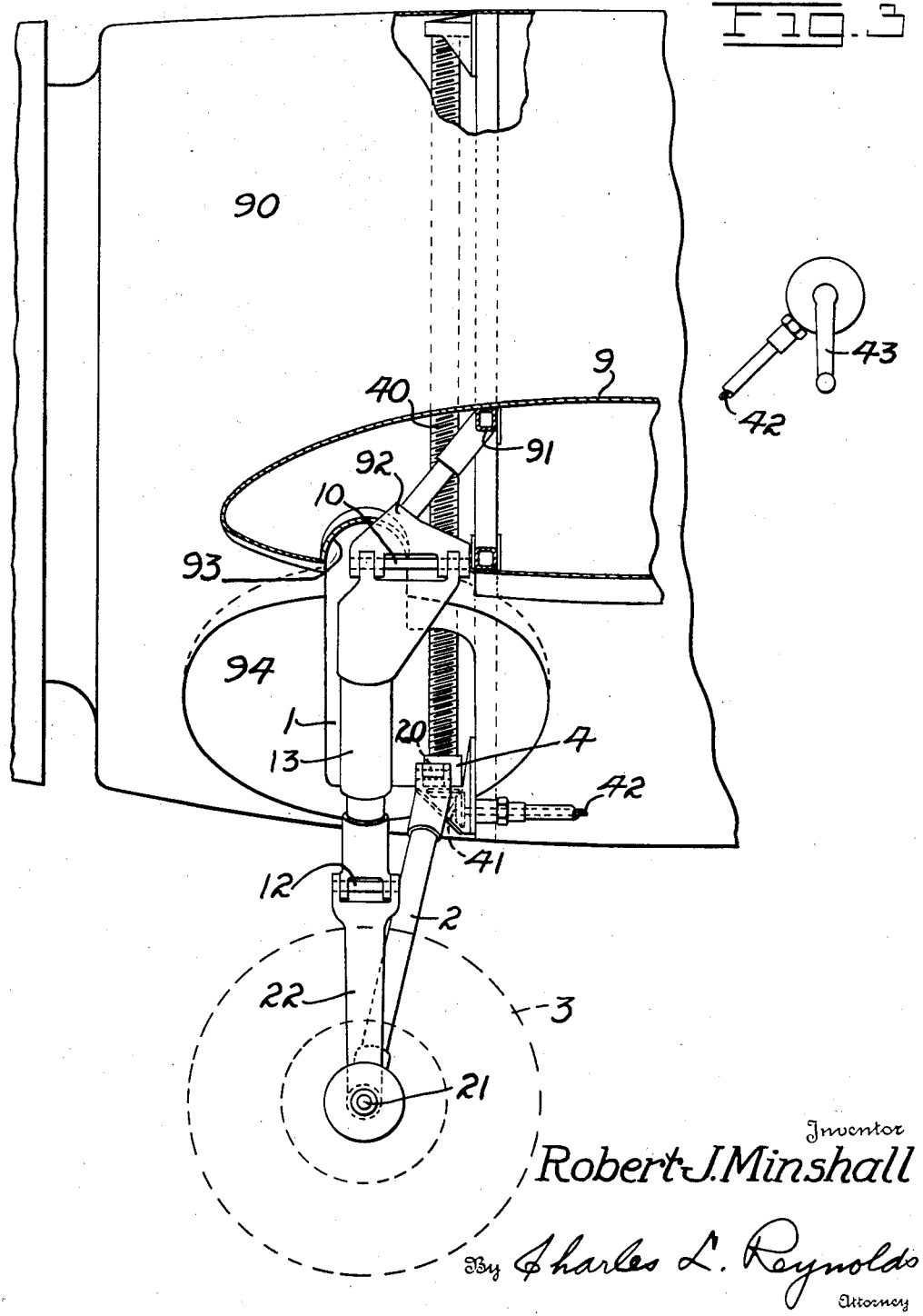

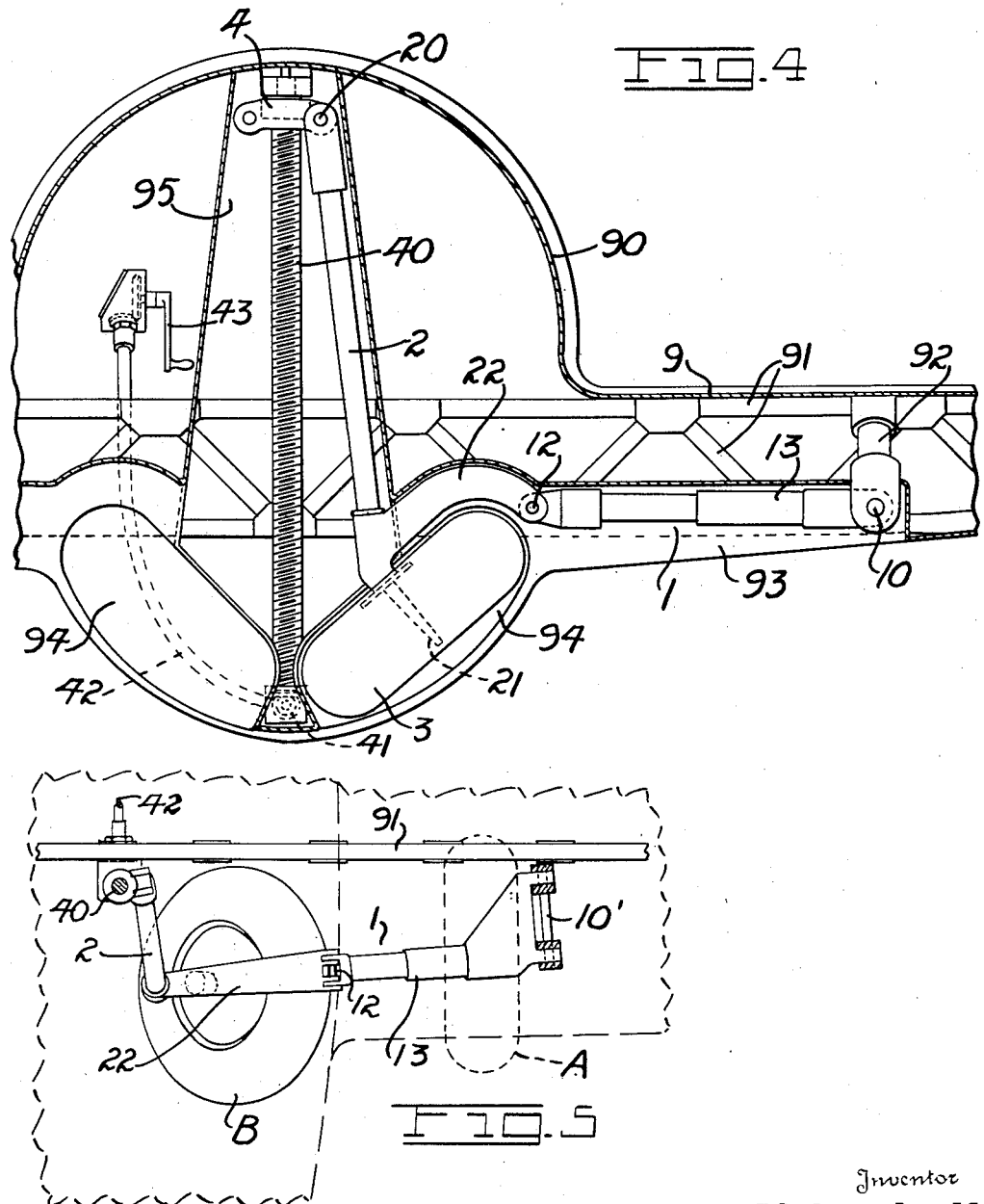

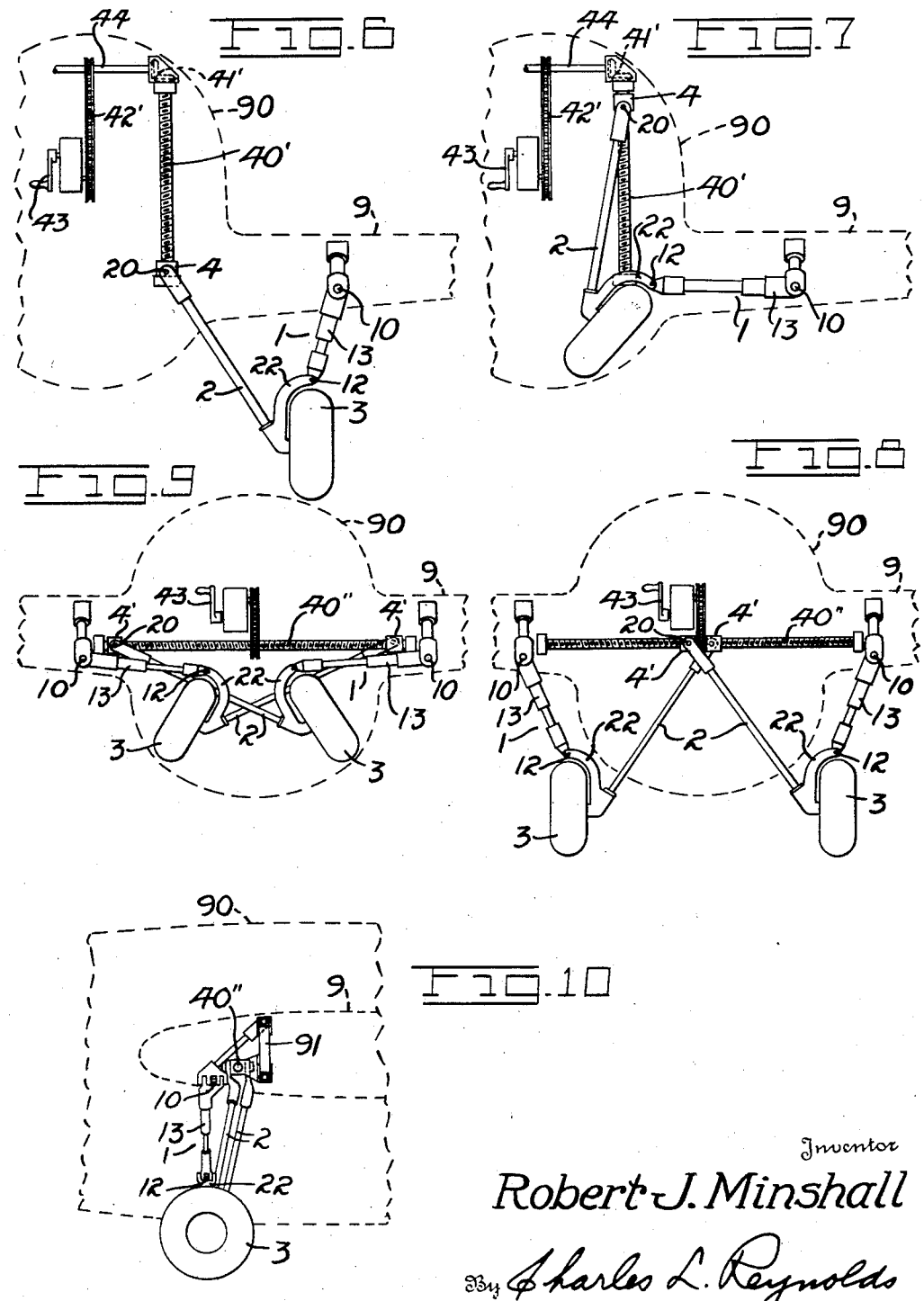

2,005,980

UNITED STATES PATENT OFFICE 2,005,980

RETRACTABLE LANDING GEAR

Robert J. Minshall, Seattle, Wash., assignor to Boeing Airplane Company, Seattle, Wash., a corporation of Washington Application July 12, 1933, Serial No. 680,084

9 Claims. (Cl. 244—2)

The present invention relates to landing gears for aircraft, and is particularly valuable in connection with low-wing or mid-wing airplanes.

It is an object of the invention to provide a retractable landing gear for airplanes, wherein the landing gear may be completely retracted within the normal outline of the airplane structure, which may have incorporated in it a shock absorber of the oleo type, and preferably one which does not require a drag strut for bracing the landing gear, thereby permitting the landing gear to be mounted upon the forward side of the front wing spar, and to be retracted into recesses in the wings and/or in the fuselage, which recesses lie wholly in advance of the plane of the front wing spar.

It is a further object to provide a landing gear of the general type indicated, in which the landing wheel is freely accessible for removal and replacement.

It is a further object to provide a landing gear of this type which shall be strong and yet light, and which may be supported and braced directly upon the front wing spar.

My invention comprises the novel parts, and the novel combination and arrangement thereof, as shown in the accompanying drawings, as described in this specification, and as will be more particularly defined by the claims which terminate the same.

In the accompanying drawings I have shown my invention embodied in various typical forms.

Figure 1 is an under side plan view of an airplane, incorporating my landing gear, and Figure 2 is a front elevation of the same.

Figure 3 is a side elevation of the landing gear, its mounting, and its operating means, the wing being shown in section, and Figure 4 is a transverse section through the fuselage and wing, in advance of the front wing spar, illustrating the same landing gear.

Figure 5 is an under side plan view of a slightly modified arrangement, Figure 6 is a diagrammatic front elevation, showing a further modification with the landing gear projected, and Figure 7 is a similar view, showing the landing gear retracted.

Figure 8 is a view similar to Figure 6, and Figure 9 is a view similar to Figure 7, showing a further modified form, and Figure 10 is a side elevation of this form.

The present invention will be particularly valuable in conjunction with light military aircraft, fighter planes, where it is essential that the wing be comparatively thin and light, yet extraordinarily strong, and where it is necessary to avoid all possible projections tending to produce drag. In such airplanes it is not possible to swing the landing gear on a transverse axis in the ordinary manner, and to remove the wheel entirely within the airplane structure. Since the fuselage of such planes is usually quite short, it is desirable to locate the landing wheels and landing gear well forward, in order that it may be well in advance of the center of gravity, and to maintain the landing gear without appreciable longitudinal movement from one position to the other, since this would alter the location of the center of gravity. Heretofore drag struts were employed in such retractable landing gears, intended to be swung about a longitudinal axis and moved completely within the recesses in the wing and/or fuselage, and it was only possible to support the landing gear between the wing spars, for if the vertical strut is supported in advance of the front wing spar, because of the thinness of the wings it will ordinarily be found that the junction of the vertical and drag struts must lie below the front wing spar, and thus projects into the air stream, or the spar will be weakened by recessing, or made too heavy. Accordingly, I propose to eliminate the use of drag struts and to support the landing gear in advance of but directly supported upon the front wing spar, and to mount it to swing about a longitudinal axis, whereby when retracted the entire vertical strut, which may incorporate oleo shock absorbing means, together with the landing wheel, and all connected parts, are retracted within recesses in the wing and/or fuselage, to the end that all parts of the landing gear are withdrawn within the stream lines of the structure, without the necessity of enlarging or strengthening the same to accommodate the landing gear.

A typical embodiment of my invention is illustrated in Figures 1 to 4, inclusive. Here the wings 9 are directly joined to the fuselage 90, either at the bottom of the fuselage to make a low-wing construction, or, as shown, to form a mid-wing construction, and the spars, typified by the front spar 91, extend completely through the fuselage from one wing to the other. The landing gear comprises only a vertical strut, generally designated by the numeral 1, and a transverse strut 2. When I refer to a vertical strut it is not to be understood that this is or must be strictly vertical, but it may be inclined somewhat, as shown. Nevertheless, since it resists upward or vertical stresses in landing it is conveniently termed a vertical strut.

The upper end of the vertical strut 1 is pivotally mounted at 10 upon the airplane structure. Preferably a suitable bracket 92 is provided, which projects in advance of the front spar 91 and is secured directly thereto in such manner that the pivotal mounting at 10 resists upward, longitudinal and torsional stresses, but permits swinging of the vertical strut transversely of the airplane.

The transverse strut 2 is preferably pivotally mounted at its upper inner end upon the airplane structure, as indicated at 20, and at its lower outer end is provided with a spindle 21 which is rigid with the strut 2, and which receives a landing wheel of any suitable type, indicated at 3.

The vertical strut 1 and the transverse strut 2 are suitably connected. Preferably this is through a pivotal connection, as indicated at 12, and this pivot, which is longitudinally disposed, is located at a point above the plane of the wheel 3, and preferably generally in the plane of the wheel. To this end I provide an extension 22 which is rigid with the transverse strut 2, and which is connected thereto at the spindle base inwardly of the spindle 21, as is best seen in Figure 2. By so doing, the spindle is left free and clear, and the landing wheel 3 is easily removed and replaced without disconnecting any part of the landing gear. The extension 22 and spindle 21 may be formed as part of a single forging, into which is connected the outer end of the transverse strut 2. By employing a pivotal connection at 12 it is possible to give effect to a shock absorber of the ordinary oleo type, which is incorporated in or constitutes the vertical strut 1, such as is indicated at 13. To the same end it is desirable that the mounting for the inner end of the transverse strut at 20 be a pivotal mounting.

The airplane structure is provided with a recess or recesses, for instance the recess 93 in the wing and 94 in the fuselage, within which the landing gear may be retracted, and the supports 10 and 20 are located within these recesses, when the landing gear is projected, and, of course, when it is retracted. Any suitable means may be employed for retracting the landing gear, these means being essentially means to displace the support 20 in suitable manner. To this end the point 20 may be formed as part of a nut 4 threaded upon a jack-screw 40, suitably journaled within the airplane structure. Preferably the screw 40 is vertically disposed, and if the fuselage is sufficiently narrow transversely, the single nut 4 may support the pivot 20 for each half of the landing gear. Any suitable means may be provided for rotating the screw, and to this end I have shown bevel gears 41, a flexible shaft 42, and a handle 43, by means of which the shaft 42 may be rotated by or under control of the pilot. By these or like means the landing gear may be swung upward for retraction or downward for projection at the will of the pilot. To accommodate the transverse strut 2, when it is retracted, the fuselage may incorporate a recess 95 communicating with the recess 94, but since the vertical strut is retracted substantially vertically, this recess 95 occupies but a small space in the center of the fuselage, as may be seen in Figure 4, and does not interfere with control, fuel supply or military installations, or the like, in this part of the structure.

When the landing gear is retracted the vertical strut 1 lies within the recess 93 in advance of the wing spar 91 and wholly within the outline of the leading edge of the wing, and the wheel 3 lies wholly within the recess 94 within the outline of the fuselage. The drag strut being omitted, it is not necessary to alter the form of the wing spar 91, nor the outside of the wing or fuselage in order to accommodate the same.

In some designs the wheel itself may, when retracted, interfere with the wing spar 91, if the pivot support at 10 extends precisely longitudinally of the airplane, and it may be desirable to incline the axis of the pivot support at 10 slightly in a generally horizontal plane in order to cause the wheel 3 to swing slightly forwardly as it swings upwardly in retracting. Such an arrangement has been shown in Figure 5, wherein the pivot 10' is slightly inclined, and the wheel swings from the dotted line position A, where it lies partly to the rear of the wing spar 91, to a retracted full line position at B, where it lies substantially or wholly in advance of the wing spar.

The fuselage may be wide, or it may be desired to place the pivot support at 10 sufficiently outward of the skin of the fuselage, or it may be desired to employ a transverse strut which is so short that it will not extend to the center line of the fuselage, and in such cases the screw 40' may be located adjacent the side of the fuselage, as shown in Figures 6 and 7, and one screw may be provided to control the movement of only one half of the landing gear, the screw being duplicated at the other side of the fuselage for the other half of the landing gear. However, it is preferable that both halves be operated at the same time and by the same means, and to this end the gears 41' are located at the top of the screw and are joined through a shaft 44 from side to side, this shaft being rotated by a single means, indicated as the chain 42', as may be seen in Figures 6 and 7.

It may be desired in some installations to dispose the controlling screw transversely of the airplane, as is shown in Figures 8, 9 and 10. Here the screw 40'' is disposed horizontally and transversely of the airplane, where it may be journaled directly on the wing spar 91, and is provided with right and left threads, to which are connected the respective nuts 4'. By rotating the screw 40'' in the manner indicated above, or in any other suitable manner, the two nuts 4' are separated or caused to approach, thus retracting or projecting the landing gear.

If desired, suitable covers may be provided for the recesses 93 and 94, either incorporated in the airplane structure or supported upon the landing gear. Since arrangements of this character have been proposed heretofore, I do not deem it necessary to illustrate the same, and any arrangement suitable for use with the particular design of landing gear may be employed.

What I claim as my invention is:

1. In combination with an airplane structure, a landing wheel, a transverse strut, a spindle rigid therewith, and receiving the landing wheel, a vertical strut pivotally connected at its upper end to the airplane structure, and connected at its lower end, through a pivotal connection located substantially in the plane of and above the landing wheel, to the transverse strut, and means to withdraw into the airplane structure the end of the transverse strut which is distant from the spindle, thereby to swing upward the landing wheel and vertical strut.

2. In combination with the fuselage of an airplane and with a wing joined to said fuselage intermediate the top and bottom thereof, said fuselage, beneath the wing, having a recess to receive a landing wheel, and the wing having a recess adjacent its leading edge to receive a vertical strut therefor, a landing wheel, a spindle receiving the same, a transverse strut rigid with the spindle and connected by a pivotal connection at its inner end to the fuselage, a vertical strut pivotally supported at its upper end within the wing recess, and connected at its lower end, through a pivotal connection at a point above the landing wheel, to the outer end of the transverse strut, and means to withdraw the inner end of the transverse strut within the fuselage in a direction such that the landing wheel is drawn into the fuselage recess, and lies with its outer face substantially flush with the skin of the fuselage, the vertical strut likewise being drawn upward to lie within the wing recess.

3. In combination with an airplane structure, a landing wheel, a vertical strut pivotally supported at its upper end from the airplane structure to swing about a longitudinal axis, a spindle receiving the wheel, a transverse strut rigid with said spindle, a support upon the airplane structure engaging the upper end of the transverse strut, an upwardly projecting extension rigid with said transverse strut and spindle terminating at a point above the wheel, and pivotally connected at such point to the vertical strut, and means to displace the support for the upper end of the transverse strut, to swing the landing wheel upwardly and inwardly.

4. The combination of claim 3, wherein the extension is connected to the transverse strut adjacent to the base of the spindle, to leave the spindle and wheel outside of the extension for easy removal and replacement.

5. The combination of claim 3, wherein the vertical strut incorporates a shock absorber unit.

6. In combination with an airplane structure, a landing wheel, a spindle supporting the same, a bifurcated strut rigid with said spindle, one arm thereof extending inward from the base of the spindle and secured to the airplane structure, the other arm thereof projecting from the base of the spindle upward to a point adjacent to the periphery of said wheel, a vertical strut pivotally connected at its lower end to the upper end of such upwardly projecting arm, and pivotally connected at its upper end to the airplane structure, and means to withdraw into the airplane structure the end of the inwardly projecting arm of the bifurcated strut, thereby to swing upward the landing wheel and vertical strut.

7. In combination with an airplane structure, a landing wheel, a spindle supporting the same, a bifurcated strut rigid with said spindle, one arm thereof extending inward and pivotally connected to the airplane structure, the other arm thereof projecting upward and outward adjacent to the wheel and terminating substanially in the plane of and above the landing wheel, a vertical strut pivotally connected at its lower end to such upwardly and outwardly projecting arm, and pivotally connected at its upper end to the airplane structure, and means to withdraw into the airplane structure the end of the inwardly projecting arm of the bifurcated strut, thereby to swing upward the landing wheel and vertical strut.

8. In combination with an airplane structure, a spindle supported by one end and free at the other end, a landing wheel supported on the free end thereof, a transverse strut with its outer end rigid with the supported end of the spindle and constituting the support thereof, and connected by its inner end to the airplane structure at a point on the inner side of the wheel in its landing position, a vertical strut having no connection to the free end of said spindle and pivotally connected at its lower end to the transverse strut as distinguished from the spindle, and at its upper end pivotally connected to the airplane structure at a point on the outer side of the wheel in its landing position, and means to move the inner end of the transverse strut to swing the landing wheel and the lower end of the vertical strut inwardly and upwardly from landing position.

9. The combination of claim 8, wherein the vertical strut incorporates a shock absorber unit.

ROBERT J. MINSHALL.